United States Patent [19]

O'Lenick, Jr.

[11] Patent Number: 5,238,985

[45] Date of Patent: Aug. 24, 1993

[54] THERMOPLASTIC MOLDING COMPOSITIONS

[75] Inventors: Anthony J. O'Lenick, Jr., Lilburn, Ga.

[73] Assignee: Rhone-Poulenc Surfactants and Specialties, L.P., Monmouth Junction, N.J.

[21] Appl. No.: 519,265

[22] Filed: May 2, 1990

Related U.S. Application Data

[63] Continuation of Ser. No. 333,222, Apr. 5, 1989, abandoned, which is a continuation-in-part of Ser. No. 139,322, Dec. 30, 1987, abandoned.

[51] Int. Cl.⁵ .......................... C08K 5/05; C08K 5/06; C08K 5/10; C08K 5/11
[52] U.S. Cl. .................... 524/308; 524/315; 524/317; 524/318; 524/611
[58] Field of Search .............. 524/308, 315, 317, 318, 524/611

[56] References Cited

U.S. PATENT DOCUMENTS

| | | | |
|---|---|---|---|
| 3,544,514 | 12/1970 | Schnell et al. | 525/468 |
| 3,784,595 | 1/1974 | Shirmer et al. | |
| 3,836,499 | 9/1974 | Schirmer et al. | |
| 3,875,069 | 4/1975 | Worschech et al. | 252/56 S |
| 3,917,555 | 11/1975 | Worschech et al. | 524/298 |
| 4,065,436 | 12/1977 | Adelmann et al. | 260/47 |
| 4,097,435 | 6/1978 | Rawlings et al. | 260/28 |
| 4,131,575 | 12/1978 | Adelmann et al. | 524/611 |
| 4,143,024 | 3/1979 | Adelmann et al. | 260/31.2 XA |
| 4,421,886 | 12/1983 | Worschech et al. | 524/317 |
| 4,425,458 | 1/1984 | Lindner et al. | 524/314 |
| 4,431,673 | 2/1984 | Goldner et al. | 514/770 |
| 4,481,324 | 11/1984 | Hall et al. | 524/611 |
| 4,562,222 | 12/1985 | Liu | 524/537 |
| 4,670,479 | 6/1987 | Miyauchi | 524/154 |
| 4,731,190 | 3/1988 | O'Lenick, Jr. et al. | 252/49.3 |
| 4,743,641 | 5/1988 | Shizawa et al. | 524/318 |
| 4,760,107 | 7/1988 | Nelson | 524/537 |
| 4,767,815 | 8/1988 | O'Lenick, Jr. | 524/318 |
| 4,767,815 | 8/1988 | O'Lenick, Jr. et al. | 524/317 |
| 4,791,158 | 12/1988 | Lausberg et al. | 524/537 |
| 4,868,236 | 9/1989 | O'Lenick, Jr. et al. | 524/308 |
| 5,001,180 | 3/1991 | Lundy et al. | 524/314 |
| 5,045,586 | 9/1991 | O'Lenick, Jr. | 524/291 |

FOREIGN PATENT DOCUMENTS

WO8903853  5/1989  PCT Int'l Appl. .

OTHER PUBLICATIONS

Derwent Accession No. 78-04733A/03.
"Guerbet Alcohols" by O'Lenick et al., *Soap/Cosmetics/Chemical Specialties*, Apr. 1987, pp. 52, 54, 55, 115.
Guenther Illmann, "Waxes as Lubricants in Plastics Processing," *SPE Journal*, Jun. 1967, pp. 71-76, 121.
Van Dyk, "Sunscreens, Pigments, Emollients, Emulsifiers, Conditioners" (1988).

*Primary Examiner*—Joseph L. Schofer
*Assistant Examiner*—R. H. Delmendo
*Attorney, Agent, or Firm*—Morgan & Finnegan

[57] ABSTRACT

The invention relates to thermoplastic compositions containing an effective internal lubricating amount of a branched guerbet alcohol derived ester having the formula

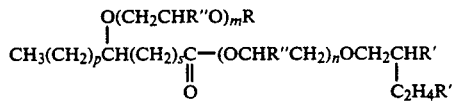

wherein R is hydrogen, —CO—alkyl or —CO—alkenyl; each R' is independently alkyl or alkenyl, said alkyl or alkenyl radicals having from 5 to 25 carbon atoms; each R" is independently hydrogen, methyl or ethyl; m and n are each integers having a value of from 0 to 150; p is an integer having a value of from 4 to 12 and s is an integer having a value of from 2 to 36. The invention also relates to the molded or extruded product of said thermoplastic composition.

62 Claims, No Drawings

THERMOPLASTIC MOLDING COMPOSITIONS

This application is a continuation of Ser. No. 333,222 filed Apr. 5, 1989, now abandoned, which is a continuation-in-part of Ser. No. 139,222 filed Dec. 30, 1987, now abandoned.

BACKGROUND OF THE INVENTION

Thermoplastic resins, as opposed to cross-linked thermosetting resins, possess a tendency to cloud and undergo discoloration under certain conditions. This effect is caused in part by polymeric decomposition when exposed to elevated temperatures, or contact with moisture or oxygen. Among the many thermoplastic resins, molded and extruded polycarbonate thermoplastics are in great demand due to their high resiliency, resistance to attack by chemical solvents, high heat stability, non-toxicity and clear, colorless film forming properties, many of which properties are lacking in thermosetting resins such as those disclosed in U.S. Pat. No. 3,917,555.

High clarity and water-white color are particularly important characteristics in polycarbonate products which demand an exceptionally high degree of colorless transparency. Further, polycarbonates of high molecular weight are generally desired for hard, resilient, transparent and colorless products such as bullet-proof safety glass, street light lenses, bottles, automotive light shields, kitchen appliances, safety glasses, packaging films and others. Clear, colorless polycarbonate sheets are particularly desirable in applications where transmission of light is required, as in the lenses of automotive headlights. Prior polycarbonate lenses have tended to yellow with time. Accordingly, it has been the aim of research to develop a polycarbonate with eliminates or minimizes this disadvantage. In U.S. Pat. No. 4,431,673 there are disclosed certain cosmetic formulations containing certain guerbet alcohol derived esters. However, such cosmetic uses do not require colorless transparency in the final product. Exceptional uniformity is also demanded for precision molded articles of high molecular weight polycarbonate thermoplastics used in laser read compact recording discs, microwave cookware and containers for comestible or medical products.

The thermoplastic moldable polycarbonates require special care in processing since many difficulties which are absent from thermosetting resins and which are unique to these resins are encountered. Notable among the difficulties in molding is the tendency of polycarbonates to degradation (i.e. discoloration and generation of carbon dioxide bubbles) in the presence of small amounts of water or methyl alcohol. It is also known that atmospheric oxygen is troublesome since it not only causes discoloration but also induces cross-linking, a condition to be avoided where resiliency and absence of color are required (Encyclopedia of Chemical Technology, Kirk-Othmer, 2nd Edtion, Vol. 6 page 108). Thus, the kneading steps employed in U.S. Pat. No. 3,917,555 for thermosetting resins, and other operations which may introduce oxygen or moisture, are strictly prohibited. It has also been suggested that the presence of esters may be detrimental since certain species swell the polymer (Encyclopedia, Ibid), tend to migrate to the polymer surface and cause stress points which lead to cracking in molded sheets during storage.

Localized overheating of thermoplastic resins may occur during the extrusion melting process wherein frictional forces generated within the extruder or other malaxing device are employed to melt the thermoplastic resin. The presence of a lubricating component such as mineral oil is previously known in the art to assist in polymer melt lubrication and reduction in thermoplastic polymer degradation.

In addition to the foregoing effects molten polycarbonate resins in particular are known to be relatively viscous. Such viscosity is affected by molecular weight and temperature. In the preparation of molded objects the reduced melt viscosity of a thermoplastic resin allows reduced molding cycle times thereby generating greater efficiency. Within design restraints it may be possible to attain decreased melt viscosity only by use of increased temperatures or reduced polymer molecular weight. The disadvantage in using elevated molding temperatures in increasing polymer degradation have been previously disclosed. Lower molecular weight polymers generally possess inferior strength properties, in particular, reduced impact and tensile properties. Accordingly there exist molding constraints which may prevent improved molding efficiency by either increased molding temperatures or reduced polymer molecular weight.

An improved internal lubricant may, however, also serve to reduce the melt viscosity of the molten resin in which it is incorporated allowing the successful molding of higher molecular weight resins compared to resins lacking such lubricant or alternatively allowing reduced injection molding times for resins of the same molecular weight. Ideally an improved internal lubricant for thermoplastic resins would possess desirable properties in both decreasing polymer degradation and reducing polymer melt viscosity.

Mold release additives perform the desirable function of permitting easy release of the molded object from the surface of the mold cavity after resolidification of the thermoplastic resin. Such additives are desirably incorporated into the polymeric resin itself, instead of being physically applied to the mold surface by the operator. Such mold release additives are referred to in the art as internal mold release additives. Sometimes, but not always, a composition may act both as a lubricant for the polymer and as a mold release additive. Thus it cannot be determined a priori from the fact of a composition's known lubricating ability that such composition also will possess good mold release properties. Not only must the composition be successful in reducing the force needed to remove the molded object from the mold, but the material must be compatible with thermoplastics and not cause polymer degradation especially at elevated temperatures. Also the composition should not cause deposition or plate out to occur on the mold surfaces (necessitating frequent mold cleaning), and should not contaminate the surface of the resulting molded object. The latter property allows coextrusion to other thermoplastic resin layers or subsequent operations such as painting, laminating, etc. to be performed without first cleaning the surface of the molded object.

A further desirable feature of the foregoing additives is that the same be a liquid which allows ease of handling and incorporation into the thermoplastic resin.

Also, it would be desirable if there were provided a composition for use with thermoplastic molding resins which combines good lubricating properties and good mold release properties in one composition, thereby reducing the number of additives that need to be incorporated into the resin.

It would additionally be desirable to provide a composition which is an efficient lubricant or mold release additive thereby reducing the amount needed to be incorporated into the polymer in order to achieve the desired result. Reduction of the amount of additive employed not only is more economical but additionally results in less overall deterioration of polymer physical properties.

Finally it would be desirable to provide a lubricant which may be surface coated onto particulated thermoplastic resins to provide good solid particle lubrication (thereby achieving improved solid flow and handling properties and improved extruder feed and mixing) which properties are enhanced due to concentration of the additive as an evenly dispersed film on the surfaces of the particulated thermoplastic resin; subsequent effective incorporation into the polymeric melt for good melt lubrication; and desired mold release performance.

It is an object of this invention to overcome the above disadvantages and to provide at least some of the desirable lubricant features discussed above.

THE INVENTION

In accordance with this invention, there is provided a composition comprising a thermoplastic resin and an effective lubricating amount of a branched guerbet alcohol derived ester having the formula

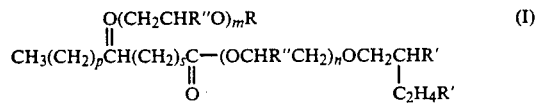

(I)

wherein R is hydrogen, —CO—alkyl or —CO—alkenyl; each R' is independently alkyl or alkenyl; said alkyl or alkenyl radicals having from 5 to 25 carbon atoms; each R" is independently hydrogen, methyl or ethyl; m and n are each integers having a value of from 0 to 150; p is an integer having a value of from 4 to 12 and s is an integer having a value of from 2 to 36.

Preferred lubricating agents of this invention are those where each of m and n have a value of from 0 to 15; R is —CO—alkyl; R' is alkyl containing from 6 to 20 carbon atoms; p has a value of from 4 to 8 and s has a value of from 6 to 16. Particularly preferred are those where each R' is alkyl having from 8 to 10 carbon atoms, m and n are zero and R is CO—$C_{15}$ to $C_{19}$ alkyl.

It is recognized that one technique for preparing branched guerbet alcohol derived esters involves the reaction of a guerbet alcohol or guerbet alcohol alkoxylate with a hydroxy substituted fatty acid, alkoxylate or alkoyl derivative thereof. Under the reaction conditions employed it is possible to prepare additional transesterification products, including oligomers and polymers. For example, the esterification of 12-stearoyloxy stearic acid with a guerbet alcohol may result in the preparation of an equilibrium mixture of all possible products including 2-octyldodecyl-12-stearoyloxy stearate, 2-octyldodecyl stearate, the self esterified cyclic derivative

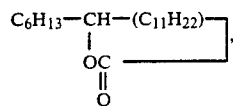

and/or oligomeric or polymeric derivatives. These oligomeric or polymeric derivatives are the result of reaction between the hydroxyl functionality of the hydroxy substituted fatty acid and the acid functionality of a neighboring molecule under ester exchange conditions. These oligomeric or polymeric derivatives correspond to the formula:

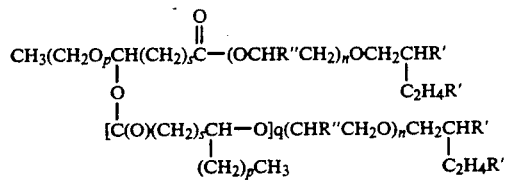

wherein R", R', n, p and s are as previously defined, and q is an integer from 1 to about 10. Thus it is understood that the lubricants employed in the present invention need not be pure compositions having the stated formula but more often comprise mixtures of the stated products and related by-products of the reaction.

The thermoplastic resins which are benefited by inclusion of the present guerbet derived lubricants include resins of polystyrene, polyvinyl chloride, polyphenylene oxide, styrene-acrylonitrile copolymer (SAN), polysulfones, polyarylates, polyamides, polyimides, polyesters, butadiene rubber modified SAN (ABS), ethylene-propylene-diene rubber modified SAN (AES), polycarbonate, polyester carbonates and the like including mixtures and polymeric amalgams thereof; polycarbonate thermoplastic resins being preferred.

Among the various types of polycarbonates, those derived from the reaction of phosgene or the transesterification of diphenyl carbonate with diphenolic compounds of the following formula are preferred.

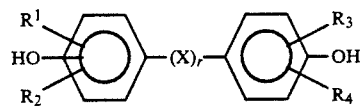

where $R_1$, $R_2$, $R_3$ and $R_4$ are each independently hydrogen, lower alkyl or halogen; r has a value of 0 or 1 and X is —SO—;

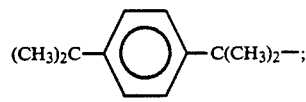

alkylene; alky substituted alkylene or phenyl substituted alkylidene; cycloalkylene, monoalkyl- or polyalkylphenylene; cycloalkylidene, or ether, thioether, ketone, sulfone or sulfoxide containing derivatives thereof, having up to 30 carbons. Examples of these preferred thermoplastic polycarbonates include those prepared from 4,4'-isopropylidene diphenol (bisphenol A), 4,4'-dihydroxydiphenyl, 1,1-bis(4-hydroxyphenyl)-1-phenylethane, 2,4-bis(4-hydroxyphenyl)-2-methyl butane, 1,1-bis(4-hydroxyphenyl)-cyclohexane 2,3-bis(4-hydroxyphenyl)-sulfoxide, 2,2-bis(3-methyl-4-hydroxyphenyl)-propane 2,4-bis(3-chloro-4-hydroxyphenyl)-butane 2,4-bis(4-hydroxyphenyl)2-butene 2,3-bis(3,5-dimethyl-4-hydroxyphenyl)-propane 2,3-bis(3,5-diethyl-4-hydroxyphenyl)-2-methylbutane 2,2-bis(3,5-dichloro-4-hydroxyphenyl)-propane 2,2-bis(3,5-dibromo-4-hydroxyphenyl)-propane. A highly preferred polycarbonate is bisphenol A polycarbonate.

Also, the aromatic polycarbonates can be branched due to the incorporation of small amounts, preferably of between 0.05 and 2.0 mol % (relative to diphenols employed), of polyfunctional compounds, especially compounds with three or more phenolic hydroxyl groups.

Polycarbonates of this type are described, for example, in German Offenlegungsschriften (German Published Specifications) Nos. 1,570,533, 1,595,762, 2,116,974 and 2,113,347; British Patent Specification No. 1,079,821; U.S. Pat. No. 3,544,514 and German Patent Application No. P 25 00 092.4.

Some examples of compounds with three or more phenolic hydroxyl groups which can be used are: phloroglucinol, 4,6-dimethyl-2,4,6-tri-4-hydroxyphenyl)-heptane-2, 4,6-dimethyl-2,4,6-tri-(4-hydroxyphenyl)-heptane, 1,4,5-tri-(4-hydroxyphenyl)-benzene, 1,1,1-tri-(4-hydroxyphenyl)-ethane, tri-(4-hydroxyphenyl)-phenylmethane, 2,2-bis-(4,4-bis-(4-hydroxyphenyl)-cyclohexyl)-propane, 2,4-bis-(4-hydroxyphenylisopropyl)-phenol, 2,6-bis-(2-hydroxy-5-methylbenzyl)-4-methylphenol, 2-(4-hydroxyphenol), 2-2,4-(dihydroxyphenyl)-propane, hexa(4-(4-hydroxyphenylisopropyl)-phenyl)orthoterephthalic acid ester, tetra-(4-hydroxyphenyl)-methane and 1,4-bis-((4',4"-dihydroxytriphenyl)methyl)-benzene. Other polyfunctional compounds include 2,4-dihydroxybenzoic acid and trimesic acid.

The thermoplastic polymers employed in the present compositions preferably have a mean weight average molecular weight of from about 10,000 to 3 million. Polycarbonates employed in the present compositions preferably have a mean weight-average molecular weight of from about 10,000 to about 200,000; most preferably from about 20,000 to about 80,000; (as determined by measurement of relative viscosity in $CH_2Cl_2$ at 25° C. at a concentration of 0.5% by weight using a polystyrene standard).

The thermoplastic polymer or mixture of thermoplastic polymers are mixed in particulate form with the present lubricant or the polymer or mixture of polymers can be combined as a melt with the lubricant.

The branched guerbet alcohol derived esters are preferably employed in a concentration of from about 0.025% to about 1.0%; most preferably from about 0.1% to about 0.25% by weight of the total thermoplastic resin compositions. However, concentrations of from about 0.01% to about 2% by weight can be employed, if desired.

In general the additives may be added to the polymer prior to devolatilization, or at any time prior to or during any extrusion or molding operation so as to obtain uniform incorporation and dispersion thereof. In a highly preferred embodiment there is provided a particulated thermoplastic resin product comprising a surface coating of a lubricating quantity of the above branched guerbet alcohol derived esters. Such particulated polymeric products have been found to possess improved solid handling properties, most notably reduced feed times to an extruder, faster melting and feed rates to the extruder and less entrained air into the polymer melt due to smoother feed and melting properties.

The present compositions also possess improved melt flow characteristics and mold release properties. This is particularly advantageous in polycarbonate containing formulations, in that the use of higher molecular weight resins in standard molding or extrusion equipment is possible.

The thermoplastic resin containing composition is preferably molded or extruded into facia or sheets at a temperature of between 200° C. and 400° C. under a pressure of from about 2,000 to about 30,000 psi; preferably at a temperature of between 260° C. and 380° C. under a pressure of from about 5,000 to about 20,000 psi; and most preferably between 280° C. and 350° C. The molded or extruded product is then cooled to room temperature. Other thermoplastic resins can be shaped at different temperatures, depending on their glass transition temperatures. The product can be recovered as a particulated thermoplastic polymeric product comprising a surface coating of a lubricating quantity of the present guerbet derived branched ester compound.

Additional additives and modifying components of conventional design may be incorporated into the compositions of the invention if desired. For example thermal stabilizers or antioxidants such as phosphates, phosphonates or thiophosphates; ignition resistant additives including sulfur compounds, halogenated compounds, salts and polytetrafluoroethylene; fibrous reinforcing additives, including glass, boron or graphite fibers; fillers, such as mica, talc, clays, etc., rubbery impact modifiers, such as butadiene based elastomers, acrylates, saturated rubbers and polar copolymer grafted derivatives thereof may be incorporated into the present compositions without departing from the scope of the present invention.

Although lacking many of the benefits and advantages of incorporating the present guerbet derived branched ester in a composition including the thermoplastic resin, the present resins could also be sprayed on the inner surface of a mold as a mold release agent. In this capacity the ester can be employed for molds shaping larger facia where release in a matter of seconds is not required, e.g. in forming automotive facia. In this case guerbet derived esters can be used in an unadulterated state or they can be diluted or emulsified with an inert solvent or emulsifying agent.

Having thus described the invention, reference is now had to the following examples which illustrate preferred embodiments and comparative examples but which are not to be construed as limiting to the scope of the invention as more broadly set forth above and in the appended claims.

EXAMPLE I

A 995 g. sample of Lexan 181, a bisphenol A-phosgene derived polycarbonate having an average molecular weight of about 60,000, was melted and 5 g. of 2-octyldodecyl-12-stearoyl stearate ester lubricant was added and thoroughly mixed at a temperature of 330° C. for 1½ minutes. The resulting mixture was then passed through a twin screw extruder at a temperature of 350° C. under 18,000 psi pressure and the polycarbonate sheet was then evaluated for clarity and for the presence of lubricant migration to the surface of the product.

It was found that the resulting extruded sheet was uniformly clear, colorless and unmarred by distortion or bubbles. The sheet was then washed with 200 ml of isopropanol. No lubricant residue was detected in the alcohol.

COMPARATIVE EXAMPLE II

Example I was repeated except that a conventional ester lubricant, pentaerythritol tetrastearate, was substituted for the lubricant of Example I. The resulting extruded sheet showed areas of deformation and possessed a yellowish color. A significant amount of lubricant residue was collected when the sheet was washed with isopropanol indicating definite migration to the surface.

EXAMPLE III

When Example 1 is repeated utilizing a copolymer of 76% styrene/24% acrylonitrile in place of the polycarbonate resin to prepare injection molded articles the resulting objects are clear, colorless and have excellent mold release properties. The same result is achieved with other thermoplastics described herein when incorporating the lubricants of this invention.

EXAMPLE IV

Extruded sheets similar to that produced in Example I are obtained when 2-octyldodecyl 6-stearoyloxy laurate, 2-hexyldodecyl 12-stearoyloxy stearate, 2-decyldodecyl 12-lauroyloxy stearate, 2-hexadecylhexadecyl 12-stearoyloxy stearate, and 2-hexadecylhexadecyl 10-hexadecoyloxy hexadecanoate or any of the guerbet derived lubricants described in the following Preparations 1-32 are substituted as the lubricant in the composition containing the thermoplastic polycarbonate.

PREPARATION OF GUERBET DERIVED LUBRICANTS

The Guerbet Alcohol (Reactant Class I)

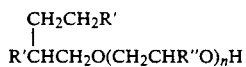

| Description | R' | n |
| --- | --- | --- |
| Reactant A | $C_{16}H_{33}$ | 0 |
| Reactant B | $C_{16}H_{33}$ | 1 |
| Reactant C | $C_{16}H_{33}$ | 3* |
| Reactant D | $C_{16}H_{33}$ | 4** |
| Reactant E | $C_{14}H_{29}$ | 0 |
| Reactant F | $C_{14}H_{29}$ | 1*** |
| Reactant G | $C_{14}H_{29}$ | 3* |
| Reactant H | $C_{14}H_{29}$ | 4** |

*2/1 molar ratio of ethylene oxide and propylene oxide alkoxylated derivative
**2/1/1 molar ratio of ethylene oxide/propylene oxide/ethylene oxide alkoxylated derivative
***ethylene oxide alkoxylated derivative The Hydroxy Stearic Acid (Reactant Class II)

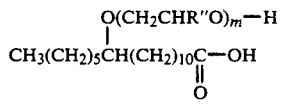

| Description | m |
| --- | --- |
| Reactant Y | 0 |
| Reactant W | 1* |
| Reactant V | 3** |
| Reactant Z | 4*** |

*ethoxylated derivative
**2/1 ethylene oxide/propylene oxide alkoxylated derivative
***2/1/1 ethylene oxide/propylene oxide/ethylene oxide alkoxylated derivative Fatty Acids (Reactant Class III)

| Stearic Acid | Lauric Acid | Caprylic Acid |
| --- | --- | --- |

Preparation 1

In a suitable glass reaction vessel is added 337.9 grams of Reactant A (Class I) and 340.1 grams of Reactant Y (Class II) under good agitation and nitrogen sparge. Add 2.0 gram of stannous oxylate (esterification catalyst) and begin to heat. The reaction begins as the temperature reaches 140° C. Continue to heat 200° C. and apply vacuum as the rate of distillation slows. A minimum of 97% of the theoretical water is removed before proceeding, 322.0 grams of stearic acid is added and the reaction is continued at 140° to 200° C., apply vacuum as the rate of distillation slows. A minimum of 97% of the theoretical water is removed, giving the desired product, and small quantities of transesterification by-products.

Preparation 2

In a suitable glass reaction vessel is added 401.7 grams of Reactant A (Class I) and 404.27 grams of Reactant Y (Class II) under good agitation and nitrogen sparge. Add 2.0 grams of a titanate esterification catalyst and begin to heat. The reaction begins as the temperature reaches 140° C. Continue to heat to 200° C. and apply vacuum as the rate of distillation slows. A minimum of 97% of the theoretical water is removed before proceeding. 194.0 grams of caprylic acid is added and the reaction is continued at 140° C. to 200° C., apply vacuum as the rate of distillation slows. A minimum of 97% of the theoretical water is removed, giving the desired product, and small quantities of transesterification by-products.

Preparation 3

In a suitable glass reaction vessel is added 470.35 grams of Reactant Y (Class I) and 317.8 grams of Reactant C (Class II) under good agitation and nitrogen sparge. Add 2.0 grams of a suitable esterification catalyst and begin to heat. The reaction begins as the temperature reaches 140° C. Continue to heat to 200° C. and apply vacuum as the rate of distillation slows. A minimum of 97% of the theoretical water is removed before proceeding. 211.9 grams of lauric acid is added and the reaction is continued at 140° C. to 200° C., apply vacuum as the rate of distillation slows. A minimum of 97% of the theoretical water is removed, giving the desired product, and small quantities of transesterification by-products.

Preparation 4

In a suitable glass reaction vessel is added 455.2 grams of Reactant D (Class I) and 279.8 grams of Reactant Y (Class II) under good agitation and nitrogen sparge. Add 2.0 gram of tin oxide (esterification catalyst) and begin to heat. The reaction begins as the temperature reaches 140° C. Continue to heat to 200° C. and apply vacuum as the rate of distillation slows. A minimum of 97% of the theoretical water is removed before proceeding. 265.0 grams of stearic acid is added and the reaction is continued at 140° C. to 200° C., apply vacuum as the rate of distillation slows. A minimum of 97% of the theoretical water is removed, giving the desired product, and small quantities of transesterification by-products.

Preparation 5

In a suitable glass reaction vessel is added 378.2 grams of Reactant E (Class I) and 420.1 grams of Reactant Y (Class II) under good agitation and nitrogen sparge. Add 2.0 gram of para toluene sulfonic acid (esterification catalyst) and begin to heat. The reaction begins as the temperature reaches 140° C. Continue to heat to 200° C. and apply vacuum as the rate of distillation slows. A minimum of 97% of the theoretical water is removed before proceeding. 201.7 grams of caprylic acid is added and the reaction is continued at 140° to 200° C., apply vacuum as the rate of distillation slows. A minimum of 97% of the theoretical water is removed, giving the desired product, and small quantities of transesterification by-products.

Preparation 6

In a suitable glass reaction vessel is added 385.8 grams of Reactant F (Class I) and 368.5 grams of Reactant Y (Class II) under good agitation and nitrogen sparge. Add 2.0 gram of tin oxide (esterification catalyst) and begin to heat. The reaction begins as the temperature reaches 140° C. Continue to heat to 200° C. and apply vacuum as the rate of distillation slows. A minimum of 97% of the theoretical water is removed before proceeding. 245.7 grams of lauric acid is added and the reaction is continued at 140° C. to 200° C., apply vacuum as the rate of distillation slows. A minimum of 97% of the theoretical water is removed, giving the desired product, and small quantities of transesterification by-products.

Preparation 7

In a suitable glass reaction vessel is added 440.6 grams of Reactant H (Class I) and 287.3 grams of Reactant Y (Class II) under good agitation and nitrogen sparge. Add 2.0 gram of a suitable esterification catalyst and begin to heat. The reaction begins as the temperature reaches 140° C. Continue to heat to 200° C. and apply vacuum as the rate of distillation slows. A minimum of 97% of the theoretical water is removed before proceeding. 272.0 grams of stearic acid is added and the reaction is continued at 140° C. to 200° C., apply vacuum as the rate of distillation slows. A minimum of 97% of the theoretical water is removed, giving the desired product, and small quantities of transesterification by-products.

Preparation 8

In a suitable glass reaction vessel is added 508.9 grams of Reactant H (Class I) and 331.9 grams of Reactant Y (Class II) under good agitation and nitrogen sparge. The reaction begins as the temperature reaches 140° C. Continue to heat to 200° C. and apply vacuum as the rate of distillation slows. A minimum of 97% of the theoretical water is removed before proceeding. 159.3 grams of caprylic acid is added and the reaction is continued at 140° C. to 200° C., apply vacuum as the rate of distillation slows. A minimum of 97% of the theoretical water is removed, giving the desired product, and small quantities of transesterification by-products.

Preparation 9

In a suitable glass reaction vessel is added 321.9 grams of Reactant A (Class I) and 371.4 grams of Reactant W (Class II) under good agitation and nitrogen sparge. Add 2.0 gram of tin oxide (esterification catalyst) and begin to heat. The reaction begins as the temperature reaches 140° C. Continue to heat to 200° C. and apply vacuum as the rate of distillation slows. A minimum of 97% of the theoretical water is removed before proceeding. 306.7 grams of stearic acid is added and the reaction is continued at 140° C. to 200° C., apply vacuum as the rate of distillation slows. A minimum of 97% of the theoretical water is removed, giving the desired product, and small quantities of transesterification by-products.

Preparation 10

In a suitable glass reaction vessel is added 379.2 grams of Reactant A (Class I) and 437.6 grams of Reactant W (Class II) under good agitation and nitrogen sparge. Add 2.0 gram of metallic tin (esterification catalyst) and begin to heat. The reaction begins as the temperature reaches 140° C. Continue to heat to 200° C. and apply vacuum as the rate of distillation slows. A minimum of 97% of the theoretical water is removed before proceeding. 183.2 grams of caprylic acid is added and the reaction is continued at 140° C. to 200° C., apply vacuum as the rate of distillation slows. A minimum of 97% of the theoretical water is removed, giving the desired product, and small quantities of transesterification by-products.

Preparation 11

In a suitable glass reaction vessel is added 449.4 grams of Reactant C (Class I) and 348.1 grams of Reactant W (Class II) under good agitation and nitrogen sparge. Add 2.0 gram of a suitable esterification catalyst and begin to heat. The reaction begins as the temperature reaches 140° C. Continue to heat to 200° C. and apply vacuum as the rate of distillation slows. A minimum of 97% of the theoretical water is removed before proceeding. 202.4 grams of lauric acid is added and the reaction is continued at 140° C. to 200° C., apply vacuum as the rate of distillation slows. A minimum of 97% of the theoretical water is removed, giving the desired product, and small quantities of transesterification by-products.

Preparation 12

In a suitable glass reaction vessel is added 437.3 grams of Reactant D (Class I) and 308.2 grams of Reactant W (Class II) under good agitation and nitrogen sparge. Add 2.0 gram of a suitable esterification catalyst and begin to heat. The reaction begins as the temperature reaches 140° C. Continue to heat to 200° C. and apply vacuum as the rate of distillation slows. A minimum of 97% of the theoretical water is removed before proceeding. 254.5 grams of stearic acid is added and the reaction is continued at 140° C. to 200° C., apply vacuum as the rate of distillation slows. A minimum of 97% of the theoretical water is removed, giving the desired product, and small quantities of transesterification by-products.

Preparation 13

In a suitable glass reaction vessel is added 356.2 grams of Reactant E (Class I) and 453.8 grams of Reactant W (Class II) under good agitation and nitrogen sparge. Add 2.0 gram of tin oxide (esterification catalyst) and begin to heat. The reaction begins as the temperature reaches 140° C. Continue to heat to 200° C. and apply vacuum as the rate of distillation slows. A minimum of 97% of the theoretical water is removed before proceeding. 190.0 grams of caprylic acid is added and the reaction is continued at 140° C. to 200° C., apply vacuum as the rate of distillation slows. A minimum of 97% of the theoretical water is removed, giving the desired product, and small quantities of transesterification by-products.

Preparation 14

In a suitable glass reaction vessel is added 366.0 grams of Reactant F (Class I) and 401.0 grams of Reactant W (Class II) under good agitation and nitrogen sparge. Add 2.0 gram of a suitable esterification catalyst and begin to heat. The reaction begins as the temperature reaches 140° C. Continue to heat to 200° C. and apply vacuum as the rate of distillation slows. A minimum of 97% of the theoretical water is removed before proceeding. 233.1 grams of lauric acid is added and the reaction is continued at 140° C. to 200° C., apply vacuum as the rate of distillation slows. A minimum of 97% of the theoretical water is removed, giving the desired product, and small quantities of transesterification by-products.

Preparation 15

In a suitable glass reaction vessel is added 423.0 grams of Reactant H (Class I) and 316.2 grams of Reactant W (Class II) under good agitation and nitrogen sparge. Add 2.0 gram of para toluene sulfonic acid (esterification catalyst) and begin to heat. The reaction begins as the temperature reaches 140° C. Continue to heat to 200° C. and apply vacuum as the rate of distillation slows. A minimum of 97% of the theoretical water is removed before proceeding. 261.1 grams of stearic acid is added and the reaction is continued at 140° C. to 200° C., apply vacuum as the rate of distillation slows. A minimum of 97% of the theoretical water is removed, giving the desired product, and small quantities of transesterification by-products.

Preparation 16

In a suitable glass reaction vessel is added 485.2 grams of Reactant H (Class I) and 362.9 grams of Reactant W (Class II) under good agitation and nitrogen sparge. Add 2.0 gram of a suitable esterification catalyst and begin to heat. The reaction begins as the temperature reaches 140° C. Continue to heat to 200° C. and apply vacuum as the rate of distillation slows. A minimum of 97% of the theoretical water is removed before proceeding. 152.0 grams of caprylic acid is added and the reaction is continued at 140° C. to 200° C., apply vacuum as the rate of distillation slows. A minimum of 97% of the theoretical water is removed, giving the desired product, and small quantities of transesterification by-products.

Preparation 17

In a suitable glass reaction vessel is added 290.0 grams of Reactant A (Class I) and 433.8 grams of Reactant V (Class II) under good agitation and nitrogen sparge. Add 2.0 gram of an organic titanate (esterification catalyst) and begin to heat. The reaction begins as the temperature reaches 140° C. Continue to heat to 200° C. and apply vacuum as the rate of distillation slows. A minimum of 97% of the theoretical water is removed before proceeding. 276.3 grams of stearic acid is added and the reaction is continued at 140° C. to 200° C., apply vacuum as the rate of distillation slows. A minimum of 97% of the theoretical water is removed, giving the desired product, and small quantities of transesterification by-products.

Preparation 18

In a suitable glass reaction vessel is added 335.7 grams of Reactant A (Class I) and 502.2 grams of Reactant V (Class II) under good agitation and nitrogen sparge. Add 2.0 gram of a suitable esterification catalyst and begin to heat. The reaction begins as the temperature reaches 140° C. Continue to heat to 200° C. and apply vacuum as the rate of distillation slows. A minimum of 97% of the theoretical water is removed before proceeding. 161.1 grams of caprylic acid is added and the reaction is continued at 140° C. to 200° C., apply vacuum as the rate of distillation slows. A minimum of 97% of the theoretical water is removed, giving the desired product, and small quantities of transesterification by-products.

Preparation 19

In a suitable glass reaction vessel is added 407.4 grams of Reactant C (Class I) and 409.13 grams of Reactant V (Class II) under good agitation and nitrogen sparge. Add 2.0 gram of a suitable esterification catalyst and begin to heat. The reaction begins as the temperature reaches 140° C. Continue to heat to 200° C. and apply vacuum as the rate of distillation slows. A minimum of 97% of the theoretical water is removed before proceeding. 183.5 grams of lauric acid is added and the reaction is continued at 140° C. to 200° C., apply vacuum as the rate of distillation slows. A minimum of 97% of the theoretical water is removed, giving the desired product, and small quantities of transesterification by-products.

Preparation 20

In a suitable glass reaction vessel is added 400.7 grams of Reactant D (Class I) and 366.1 grams of Reactant V (Class II) under good agitation and nitrogen sparge. Add 2.0 gram of tin oxide (esterification catalyst) and begin to heat. The reaction begins as the temperature reaches 140° C. Continue to heat to 200° C. and apply vacuum as the rate of distillation slows. A minimum of 97% of the theoretical water is removed before proceeding. 233.2 grams of stearic acid is added and the reaction is continued at 140° C. to 200° C., apply vacuum as the rate of distillation slows. A minimum of 97% of the theoretical water is removed, giving the desired product, and small quantities of transesterification by-products.

Preparation 21

In a suitable glass reaction vessel is added 294.8 grams of Reactant E (Class I) and 487.0 grams of Reactant V (Class II) under good agitation and nitrogen sparge. Add 2.0 gram of a suitable esterification catalyst and begin to heat. The reaction begins as the temperature reaches 140° C. Continue to heat to 200° C. and apply vacuum as the rate of distillation slows. A minimum of 97% of the theoretical water is removed before proceeding. 218.4 grams of lauric acid is added and the reaction is continued at 10° C. to 200° C., apply vacuum as the rate of distillation slows. A minimum of 97% of the theoretical water is removed, giving the desired product, and small quantities of transesterification by-products.

Preparation 22

In a suitable glass reaction vessel is added 327.0 grams of Reactant F (Class I) and 465.0 grams of Reactant V (Class II) under good agitation and nitrogen sparge. The reaction begins as the temperature reaches 140° C. Continue to heat to 200° C. and apply vacuum as the rate of distillation slows. A minimum of 97% of the theoretical water is removed before proceeding. 208.4 grams of lauric acid is added and the reaction is continued at 140° C. to 200° C., apply vacuum as the rate of distillation slows. A minimum of 97% of the theoretical water is removed, giving the desired product, and small quantities of transesterification by-products.

Preparation 23

In a suitable glass reaction vessel is added 386.5 grams of Reactant H (Class I) and 375.0 grams of Reactant V (Class II) under good agitation and nitrogen sparge. Add 2.0 gram of a suitable esterification catalyst and begin to heat. The reaction begins as the temperature reaches 140° C. Continue to heat to 200° C. and apply vacuum as the rate of distillation slows. A minimum of 97% of the theoretical water is removed before proceeding. 239.0 grams of stearic acid is added and the reaction is continued at 140° C. to 200° C., apply vacuum as the rate of distillation slows. A minimum of 97% of the theoretical water is removed, giving the desired product, and small quantities of transesterification by-products.

Preparation 24

In a suitable glass reaction vessel is added 416.0 grams of Reactant H (Class I) and 403.0 grams of Reactant V (Class II) under good agitation and nitrogen sparge. Add 2.0 gram of a suitable esterification catalyst and begin to heat. The reaction begins as the temperature reaches 140° C. Continue to heat to 200° C. and apply vacuum as the rate of distillation slows. A minimum of 97% of the theoretical water is removed before proceeding. 181.0 grams of lauric acid is added and the reaction is continued at 140° C to 200° C., apply vacuum as the rate of distillation slows. A minimum of 97% of the theoretical water is removed, giving the desired product, and small quantities of transesterification by-products.

Preparation 25

In a suitable glass reaction vessel is added 278.0 grams of Reactant A (Class I) and 457.0 grams of Reactant Z (Class II) under good agitation and nitrogen sparge. Add 2.0 gram of tin oxide (esterification catalyst) and begin to heat. The reaction begins as the temperature reaches 140° C. Continue to heat to 200° C. and apply vacuum as the rate of distillation slows. A minimum of 97% of the theoretical water is removed before proceeding. 265.0 grams of stearic acid is added and the reaction is continued at 140° C. to 200° C., apply vacuum as the rate of distillation slows. A minimum of 97% of the theoretical water is removed, giving the desired product, and small quantities of transesterification by-products.

Preparation 26

In a suitable glass reaction vessel is added 320.0 grams of Reactant A (Class I) and 525.7 grams of Reactant Z (Class II) under good agitation and nitrogen sparge. Add 2.0 gram of a suitable esterification catalyst and begin to heat. The reaction begins as the temperature reaches 140° C. Continue to heat to 200° C. and apply vacuum as the rate of distillation slows. A minimum of 97% of the theoretical water is removed before proceeding. 154.5 grams of caprylic acid is added and the reaction is continued at 140° C. to 200° C., apply vacuum as the rate of distillation slows. A minimum of 97% of the theoretical water is removed, giving the desired product, and small quantities of transesterification by-products.

Preparation 27

In a suitable glass reaction vessel is added 392.0 grams of Reactant C (Class I) and 432.0 grams of Reactant Z (Class II) under good agitation and nitrogen sparge. Add 2.0 gram of stannous oxylate (esterification catalyst) and begin to heat. The reaction begins as the temperature reaches 140° C. Continue to heat to 200° C. and apply vacuum as the rate of distillation slows. A minimum of 97% of the theoretical water is removed before proceeding. 176.4 grams of lauric acid is added and the reaction is continued at 140° C. to 200° C., apply vacuum as the rate of distillation slows. A minimum of 97% of the theoretical water is removed, giving the desired product, and small quantities of transesterification by-products.

Preparation 28

In a suitable glass reaction vessel is added 387.0 grams of Reactant E (Class I) and 510.36 grams of Reactant Z (Class II) under good agitation and nitrogen sparge. Begin to heat. The reaction begins as the temperature reaches 140° C. Continue to heat to 200° C. and apply vacuum as the rate of distillation slows. A minimum of 97% of the theoretical water is removed before proceeding, and small quantities of transesterification by-products.

Preparation 29

In a suitable glass reaction vessel is added 281.3 grams of Reactant E (Class I) and 510.3 grams of Reactant Z (Class II) under good agitation and nitrogen sparge Add 2.0 gram of an organic titanate (esterification catalyst) and begin to heat. The reaction begins as the temperature reaches 140° C. Continue to heat to 200° C. and apply vacuum as the rate of distillation slows. A minimum of 97% of the theoretical water is removed before proceeding, and small quantities of transesterification by-products.

Preparation 30

In a suitable glass reaction vessel is added 312.8 grams of Reactant F (Class I) and 488.0 grams of Reactant Z (Class II) under good agitation and nitrogen sparge. Add 2.0 gram of a suitable esterification catalyst and begin to heat. The reaction begins as the temperature reaches 140° C. Continue to heat to 200° C. and apply vacuum as the rate of distillation slows. A minimum of 97% of the theoretical water is removed before proceeding, and small quantities of transesterification by-products.

Preparation 31

In a suitable glass reaction vessel is added 373.0 grams of Reactant H (Class I) and 397.0 grams of Reactant Z (Class II) under good agitation and nitrogen sparge. Add 2.0 gram of tin oxide (esterification catalyst) and begin to heat. The reaction begins as the temperature reaches 140° C. Continue to heat to 200° C. and apply vacuum as the rate of distillation slows. A minimum of 97% of the theoretical water is removed before proceeding. 230.2 grams of stearic acid is added and the reaction is continued at 140° C. to 200° C., apply vacuum as the rate of distillation slows. A minimum of 97% of the theoretical water is removed, giving the desired product, and small quantities of transesterification by-products.

Preparation 32

In a suitable glass reaction vessel is added 400.0 grams of Reactant H (Class I) and 426.0 grams of Reactant Z (Class II) under good agitation and nitrogen sparge. Add 2.0 gram of an organic titanate (esterification catalyst) and begin to heat. The reaction begins as the temperature reaches 140° C. Continue to heat to 200° C. and apply vacuum as the rate of distillation slows. A minimum of 97% of the theoretical water is removed, giving the desired product, and small quantities of transesterification by-products.

Additional examples for the preparation of guerbet derived branched esters which can be used in this invention to provide superior mold release and uniform lubricity in thermoplastic resin compositions are effected by substituting other guerbet alcohols wherein R' is $C_5$ to $C_{25}$ alkyl or alkenyl and other fatty acids to prepare esters according to formula (I) wherein p has a value of 4-12, s has a value of 2 to 36 and R is hydrogen or —CO—alkyl or —CO—alkenyl in Preparations 1-32 above.

What is claimed is:

1. A composition comprising a polycarbonate resin and an effective lubricating amount of branched guerbet alcohol derived ester having the formula

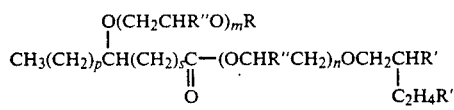

wherein R is hydrogen, —CO—alkyl or —CO—alkenyl; each R' is independently alkyl or alkenyl; said alkyl or alkenyl radicals having from 5 to 25 carbon atoms; each R" is independently hydrogen, methyl or ethyl; m is an integer having a value of from 0 to 150; n is an integer having a value from 0 to 4; p is an integer having a value of from 4 to 12 and s is an integer having a value of from 2 to 36.

2. The composition of claim 1 wherein p has a value of from 4 to 8 and s has a value of from 6 to 16.

3. The composition of claim 1 wherein R is

and m has a value of from 0 to 15.

4. The composition of claim 3 wherein each R' is independently $C_6$ to $C_{20}$ alkyl.

5. The composition of claim 1 wherein m and n are zero.

6. The composition of claim 4 wherein each R' is independently $C_6$ to $C_{10}$ alkyl and R is —CO—alkyl having from 16 to 20 carbon atoms.

7. The composition of claim 1 wherein R" is hydrogen.

8. The composition of claim 1 wherein the ester is

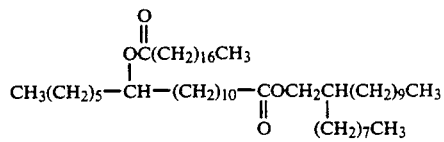

and the polycarbonate thermoplastic resin is derived from a bisphenol having the formula

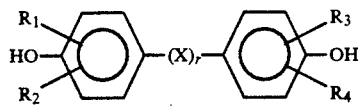

wherein $R_1$, $R_2$, $R_3$ and $R_4$ are each independently hydrogen, lower alkyl or halogen; r has a value of 0 or 1 and X is —SO—,

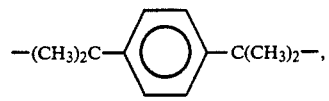

alkylene, alkylidene, phenyl substituted alkylene, phenyl substituted alkylidene, cycloalkylene, monoalkyl or polyalkyl phenylene, cycloalkylidene or ether, thioether, ketone, sulfone or sulfoxide containing derivatives thereof having up to 30 carbons.

9. The composition of claim 1 wherein the branched ester is

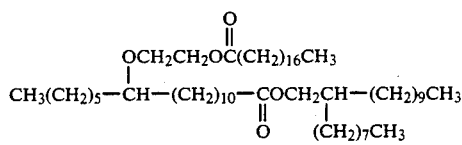

and the polycarbonate thermoplastic resin is derived from a bisphenol having the formula

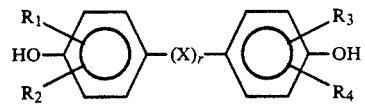

wherein $R_1$, $R_2$, $R_3$ and $R_4$ are each independently hydrogen, lower alkyl or halogen; r has a value of 0 or 1 and X is —SO—,

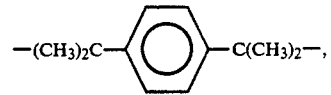

alkylene, alkylidene, phenyl substituted alkylene, phenyl substituted alkylidene, cycloalkylene, monoalkyl or polyalkyl phenylene, cycloalkylidene or ether, thioether, ketone, sulfone or sulfoxide containing derivatives thereof having up to 30 carbons.

10. The composition of claim 1 containing from about 0.025% to about 1.0% by weight of the branched ester lubricant.

11. A product of a process having the following steps:

adding an effective lubricating amount of a guerbet derived branched ester of claim 1 to a thermoplastic resin melt before molding the resulting composition at a temperature of between about 200° and 400° C.;

wherein said thermoplastic resin is a polycarbonate resin;

wherein said thermoplastic polycarbonate is derived from the polymerization of bisphenol A and phosgene, said polycarbonate having a molecular weight of from 10,000 to 200,000 and the branched ester is $$CH_3(CH_2)_5-\underset{\underset{(CH_2)_7CH_3}{|}}{\overset{\overset{O}{\|}}{\underset{|}{CH}-(CH_2)_{10}-\overset{\overset{OC(CH_2)_{16}CH_3}{|}}{\underset{\|}{C}OCH_2CH(CH_2)_9CH_3}}}$$

12. A product of a process having the following steps:
adding an effective lubricating amount of a guerbet derived branched ester of claim 1 to a thermoplastic resin melt before molding the resulting composition at a temperature of between about 200° and 400° C.;

wherein said thermoplastic resin is a polycarbonate resin;

wherein said thermoplastic polycarbonate is derived from the polymerization of bisphenol A and phosgene, said polycarbonate having a molecular weight of from 10,000 to 200,000 and the branched ester is $$CH_3(CH_2)_5-\underset{\underset{(CH_2)_7CH_3}{|}}{\overset{\overset{OCH_2CH_2OC(CH_2)_{16}CH_3}{|}}{\underset{|}{CH}-(CH_2)_{10}-\overset{O}{\underset{\|}{C}}OCH_2CH(CH_2)_9CH_3}}$$

13. A particulated polycarbonate polymeric product comprising a surface coating of a lubricating quantity of a branched guerbet alcohol derived ester having the formula $$CH_3(CH_2)_p\underset{|}{\overset{O(CH_2CHR''O)_mR}{CH}(CH_2)_s\underset{\|}{\overset{}{C}}-(OCHR''CH_2)_nOCH_2\underset{|}{\overset{}{CHR'}}}$$
$$\phantom{CH_3(CH_2)_p CH(CH_2)_s}O\phantom{-(OCHR''CH_2)_nOCH_2}C_2H_4R'$$

wherein R is hydrogen, —CO—alkyl or —CO—alkenyl, each R' is independently alkyl or alkenyl; said alkyl or alkenyl radicals having from 5 to 25 carbon atoms; each R" is independently hydrogen, methyl or ethyl; m is an integer having a value of from 0 to 50; n is an integer having a value of from 0 to 4; p is an integer having a value of from 4 to 12 and s is an integer having a value of from 2 to 36.

14. A particulated polycarbonate polymeric product according to claim 13 wherein the ester is 2-octyldodecyl 12-stearoyloxy stearate.

15. A composition comprising a polycarbonate resin and from 0.025 to 1 wt. % of a branched guerbet alcohol derived ester having the formula $$CH_3(CH_2)_p\underset{|}{\overset{O(CH_2CHR''O)_mR}{CH}(CH_2)_s\underset{\|}{\overset{}{C}}-(OCHR''CH_2)_nOCH_2\underset{|}{\overset{}{CHR'}}}$$
$$\phantom{CH_3(CH_2)_p CH(CH_2)_s}O\phantom{-(OCHR''CH_2)_nOCH_2}C_2H_4R'$$

wherein R is hydrogen, —CO—alkyl or —CO—alkenyl, each R' is independently alkyl or alkenyl; said alkyl or alkenyl radicals having from 5 to 25 carbon atoms; each R" is independently hydrogen, methyl or ethyl; m is an integer having a value of from 0 to 150; n is an integer having a value of from 0 to 4; p is an integer having a value of from 4 to 12 and s is an integer having a value of from 2 to 36.

16. The composition of claim 1 wherein said resin is in particulated form and said ester is surface coated onto said resin.

17. The composition of claim 1 wherein said ester is provided in an effective mold releasing amount.

18. The product of claim 13 wherein said quantity of ester is a mold releasing quantity.

19. A composition comprising a polycarbonate resin and an effective lubricating amount of a branched guerbet alcohol derived ester having the formula:

$$CH_3(CH_2)_5CH(CH_2)_{10}\underset{\|}{\overset{\overset{O(EO)_m-(PO)_n-(EO)_q-R}{|}}{C}}-R' \qquad (I)$$
$$\phantom{CH_3(CH_2)_5CH(CH_2)_{10}C}O$$

wherein;
R is hydrogen or $$-\overset{\overset{O}{\|}}{C}-R'',$$

R' is derived from a guerbet alcohol or a guerbet alcohol alkoxylate and conforms to the following formula;

$$R''CHCH_2O(EO)_x(PO)_y(EO)_z- \qquad (II)$$
$$\phantom{R''}\underset{|}{\overset{CH_2CH_2R''}{}}$$

EO is the ethylene oxide moiety;
PO is the propylene oxide moiety;
m is from 0 to 2; n is from 0 to 1; q is from 0 to 1;
x is from 0 to 2; y is from 0 to 1; and z is from 0 to 1;
R" is independently selected from alkyl or alkenyl having from 5 to 25 carbon atoms.

20. The composition of claim 19 wherein R is hydrogen.

21. The composition of claim 19 wherein R is $$-\overset{\overset{O}{\|}}{C}-R''.$$

22. The composition of claim 21 wherein R" at position R is alkyl.

23. The composition of claim 21, wherein R" at position R is
—(CH$_2$)$_3$, wherein a is 6 to 16.

24. The composition of claim 23 wherein R" of formula II is C$_{14}$ to C$_{20}$.

25. The composition of claim 19 wherein m, n, q, z, y, and z are 0.

26. The composition of claim 24 wherein m, n, q, x, y, and z are 0.

27. The composition of claim 19 containing from about 0.025% to about 1.0% by weight of the ester.

28. The composition of claim 27 containing from about 0.1 to about 0.25% by weight of the ester.

29. The composition of claim 1, wherein R is —CO—alkyl or —CO—alkenyl.

30. The composition of claim 1, wherein m has a value of from 0 to 4.

31. The composition of claim 30, wherein n has a value of zero.

32. The composition of claim 1, wherein R' is alkyl having from 8 to 10 carbon atoms.

33. The composition of claim 1, wherein said branched ester is present in an amount from about 0.01 to about 2% by weight.

34. The composition of claim 19, wherein said branched ester is present in an amount from about 0.1 to about 2% by weight.

35. The composition of claim 1, wherein said branched ester is

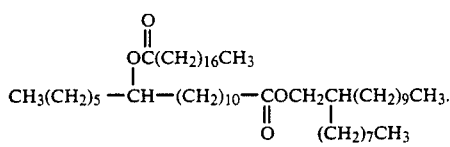

36. The composition of claim 35, containing from about 0.025% to about 1.0% by weight of the branched ester lubricant.

37. The composition of claim 35, containing from about 0.1% to about 0.25% by weight of the branched ester lubricant.

38. The composition of claim 1, wherein said branched ester is

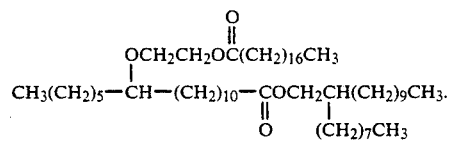

39. The composition of claim 35, containing from about 0.025% to about 1.0% by weight of the branched ester lubricant.

40. The composition of claim 35, containing from about 0.1% to about 0.25% by weight of the branched ester lubricant.

41. The composition of claim 5, wherein R'' is hydrogen.

42. The composition of claim 25, wherein R is hydrogen.

43. The composition of claim 5, wherein R' has 8 carbon atoms.

44. The composition of claim 23, wherein R'' of formula II has 8 carbon atoms.

45. The composition of claim 44, wherein the m, n, q, x, y and z are 0.

46. The composition of claim 45, wherein a is 6, 10 or 16.

47. A composition comprising a polycarbonate resin and an effective lubricating amount of the product prepared by reacting a $C_{20}$, $C_{32}$ or $C_{36}$ guerbert alcohol having the formula

where R and R' are an alkyl or alkenyl having from 5 to 25 carbon atoms and where R and R' may be the same or different, with a hydroxy stearic acid and then with a fatty acid selected from the group consisting of stearic acid, lauric acid, and caprylic acid.

48. The composition of claim 47 wherein the guerbet alcohol is a $C_{20}$ guerbet alcohol where R and R' are different.

49. The composition of claim 47 wherein the hydroxy stearic acid is 12-hydroxystearic acid.

50. The composition of claim 47 wherein the fatty acid is stearic acid.

51. The composition of claim 47 wherein the $C_{20}$ guerbet alcohol is 2-octyldodecanol, wherein the hydroxy stearic acid is 12-hydroxy stearic acid, and wherein the fatty acid is stearic acid.

52. The composition of claim 47, wherein the effective lubricating amount of the reaction product is about 0.025% to about 1.0% by weight.

53. The composition of claim 51, wherein the effective lubricating amount of the reaction product is about 0.025% to about 1.0% by weight.

54. The composition of claim 53, wherein the effective lubricating amount of the reaction product is about 0.1% to about 0.25% by weight.

55. A composition comprising a polycarbonate resin and an effective lubricating amount of the product prepared by reacting a branched guerbet alcohol or guerbet alkoxylate having the formula

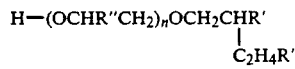

with a hydroxy substituted fatty acid, fatty acid alkoxylate, or alkoyl derivative thereof having the formula

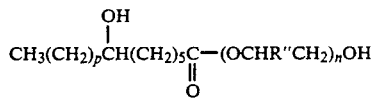

and then reacting with a fatty acid having the formula alkyl-COOH or alkenyl-COOH; where each R' is independently alkyl or alkenyl, said alkyl or alkenyl radicals having from 5 to 25 carbon atoms; each R'' is independently hydrogen, methyl, or ethyl; n is an integer having a value of from 0 to 150; p is an integer having a value of 4 to 12; and s is an integer having a value from 2 to 36.

56. The composition of claim 55, wherein the reaction is carried out under reaction conditions which lead to transesterification.

57. The composition of claim 56, wherein the reaction product is obtained by reacting a $C_{20}$ guerbet alcohol with a hydroxy stearic acid and then with stearic acid.

58. The composition of claim 57, wherein the $C_{20}$ guerbet alcohol has the formula

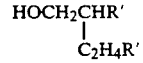

where the R' group attached to the CH group is $C_{10}H_{21}$ and the R' group attached to the $C_2H_4$ group is $C_6H_{13}$ and wherein the hydroxy stearic acid has the formula

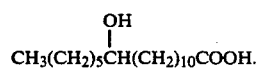
$$CH_3(CH_2)_5\overset{\underset{|}{OH}}{C}H(CH_2)_{10}COOH.$$

59. The composition of claim 55, wherein the effective lubricating amount of the reaction product is about 0.025% to about 1.0% by weight.

60. The composition of claim 58, wherein the effective lubricating amount of the reaction product is about 0.025% to about 1.0% by weight.

61. The composition of claim 55, wherein the effective lubricating amount of the reaction product is about 0.1% to about 0.025% by weight.

62. The composition of claim 58, wherein the effective lubricating amount of the reaction product is about 0.1% to about 0.25% by weight.

* * * * *